United States Patent [19]
Crane

[11] 3,751,763
[45] Aug. 14, 1973

[54] POULTRY PICKING FINGER SUPPORT
[75] Inventor: Edward J. Crane, Ottumwa, Iowa
[73] Assignee: International Agri-Systems, Inc., Ottuma, Iowa
[22] Filed: Sept. 17, 1971
[21] Appl. No.: 181,439

[52] U.S. Cl............................................. 17/11.1 R
[51] Int. Cl............................................. A22c 21/02
[58] Field of Search............................ 17/11.1 R, 67

[56] References Cited
UNITED STATES PATENTS
2,528,215   10/1950   Doupnik ......................... 17/11.1 R
FOREIGN PATENTS OR APPLICATIONS
116,500    1/1963   Australia......................... 17/11.1 R Primary Examiner—Robert Peshock
Attorney—Price, Heneveld, Huizenga & Cooper

[57] ABSTRACT

A picking finger support suitable for utilization in mechanical poultry picking machines including a bullet-shaped section formed from generally resilient material such as hard rubber. The bullet-shaped section is provided with a plurality of apertures at suitable locations thereover for receiving and retaining generally conventional picking fingers. The rear portion of the picking support is provided with a threaded interior so as to threadably receive the threaded hub on a picking apparatus. Positioned over the exterior of the threaded portion of the support is a reinforcing ring containing suitable apertures for a span wrench.

17 Claims, 5 Drawing Figures

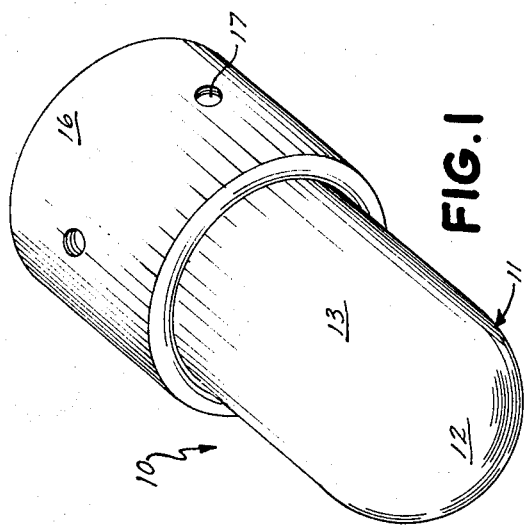
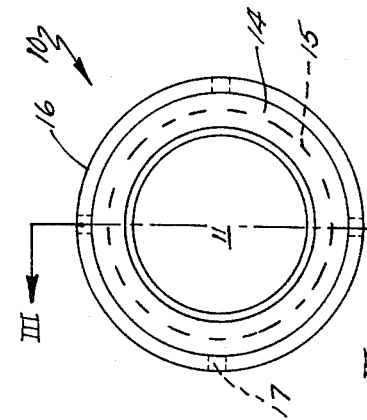
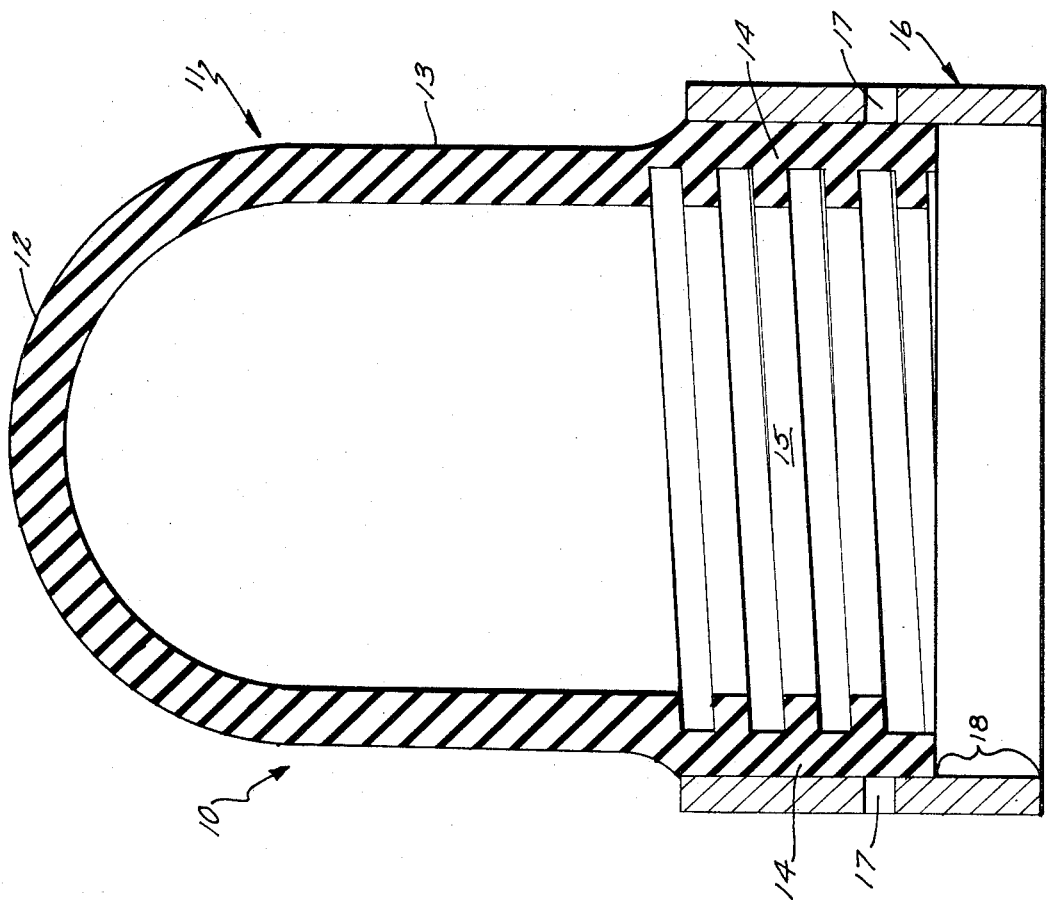
INVENTOR.
EDWARD J. CRANE
BY Chio, Heneveld
Huizenga & Cooper
ATTORNEYS

POULTRY PICKING FINGER SUPPORT

BACKGROUND OF THE INVENTION

This invention relates to poultry picking machines and, more particularly, to a novel support structure adapted to carry the picking fingers and transmit the rotational thrust or other movement from the drive mechanism to the fingers.

In U.S. Pat. No. 3,541,636 issued Nov. 24, 1970 in the name of this inventor there is illustrated a poultry picking apparatus and method employing a series of bullet-shaped picking supports. Affixed to the picking supports through suitable apertures formed therein are a series of flexible picking fingers of generally conventional nature. The supports are affixed to hubs which, in turn, are secured to shafts serving to transmit rotational thrust to the hub-support combination. The birds are brought into proximity of the moving fingers on the support and thereby defeathered.

Some difficulties have been encountered in the utilization of the apparatus and the practice of the method described in the above noted patent in that there is a tendency for the metallic finger supports to bark or bruise the birds during passage through the machines. The metallic nature of the finger supports coupled with the rather thin metal from which they are fabricated has caused, additionally, a tendency for the picking fingers to be subjected to rather high stresses at the shoulder where they attach to the support. This stress, often, results in severance and thus ruination of the fingers even though the actual bird-contacting portions thereof may be relatively unworn. These difficulties, it should be noted, are not peculiar to this particular apparatus and method, the same having been noted to exist by this Inventor in the vast majority of picking machines currently on the market today.

It is an object of this invention, therefore, to provide a novel picking support and mode of fabrication therefor which alleviate the difficulties which have been experienced with finger supports of the type available heretofore, both on machines of the specific type described in the aforementioned patent and on other machines generally in use in the poultry processing industry.

It is an object of this invention, more particularly, to provide a novel finger support capable of markedly reducing the incidence of barking and bruising due to contact of the support by the poultry and which, further, will markedly increase the life of the poultry picking fingers.

It is a further object of this invention to provide a finger support of the type described which will inherently function to dampen vibration within a poultry picking machine.

SUMMARY OF THE INVENTION

The aforementioned objects of this invention are accomplished, briefly, in a poultry picking apparatus having at least one movable finger support with a plurality of flexible picking fingers mounted thereon. Means are provided for moving the support such that the fingers thereon yieldably engage poultry placed in proximity thereto. At least those portions of the support upon which the fingers are mounted are fabricated from resilient material in the preferred embodiment of this invention.

DESCRIPTION OF THE DRAWINGS

FIG. 1 is a perspective view of the novel picking support which is the subject of this invention;

FIG. 2 is a rear elevational view thereof;

FIG. 3 is a cross-sectional view taken along plane III—III of FIG. 2;

DESCRIPTION OF THE PREFERRED EMBODIMENT

Figure 4:
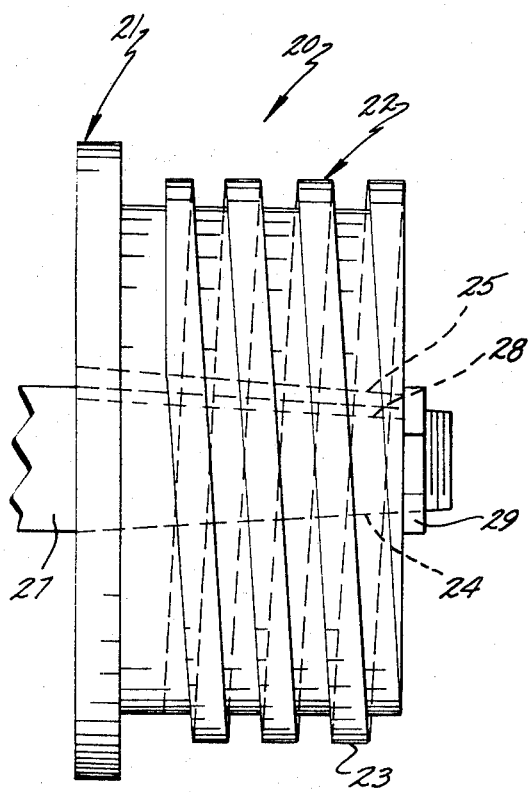
FIG. 4 is a side elevational view of a hub and shaft arrangement which has been found suitable for use in combination with the novel finger support.

Referring initially to FIGS. 1 through 3, the novel picking finger support 10 which is the subject of this invention includes a bullet-shaped section 11 having a forward convex portion 12 and a generally cylindrical rear section 13. The rear or base portion 14 of the support is enlarged radially and provided with a threaded interior. The threads, in accordance with the teachings of the preferred embodiment of this invention, are generally rectangular in cross section to facilitate molding of the support as well as its secure mounting to the hub to be discussed hereinafter.

Positioned around or enveloping the rear exterior portion of the support 10 is a cylindrical reinforcing sleeve 16. Sleeve 16 contains a plurality of span wrench apertures 17 about its periphery in circumferential alignment. The rear section of sleeve 16 extends rearwardly at 18 beyond the terminal portion of section 14 to receive the enlarged shoulder 21 of hub assembly 20 to be discussed hereinafter.

All portions of the finger support 10 excepting the reinforcing sleeve 16 are molded, preferably, from rubber or similar material which, although generally rigid in nature, exhibits some resiliency or flexibility. It has been found, for example, that the following compounds, "A", "B" and "C" may be utilized in the practice of this invention:

| | Compound A | Compound B | Compound C |
|---|---|---|---|
| Hardness durometer A | 65–75 | 57–63 | 65–75 |
| Modules at 200% psi | 800–1000 | 650–850 | 850–1050 |
| Modulus at 300% psi | 1200–1400 | 900–1100 | 1100–13–00 |
| Tensile at break psi | 2000–2300 | 3700–4000 | 3800–41–00 |
| Elongation at break % | 450–600 | 600–750 | 450–600 |
| Tear strength, ppi, Die C | 180–250 | 240–300 | 220–280 |
| Specific gravity | 1.22–1.25 | 1.10–1.12 | 1.13–1.16 |

The desirable objective, of course, is to retain sufficient evidence of flexibility and this can be accomplished only by staying below the "hard rubber" stage at approximately 90 durometer hardness. Materials which do not exhibit this evidence of flexibility (such as a hard plastic, thus, offer little advantage over metal.

The rubber should be as soft as possible while retaining the desired degree of centrifugal stability and the ability to retain the picking fingers in the apertures. The terms "flexible" or "flexible material", therefore, as utilized in this specification and the appended claims signifies a material, preferably a polymer, having a flexibility or yieldability which is significantly greater than that of metal but sufficiently rigid to retain the picking fingers in working position under typical operating conditions. Typically, as noted above, a rubber or plastic having a durometer rating in the 60–85 range will provide a satisfactory support.

The support is molded, preferably, with the reinforcing sleeve 16 in situ, the rubber exterior base 14 either being vulcanized to the metal ring 16 or otherwise adhered thereto by any conventional molding technique.

Referring now additionally to FIG. 4, there is illustrated a hub assembly suitable for use in conjunction with the finger support 10. The hub assembly 20, which is preferably fabricated from nylon or a non-abrasive material of similar strength, includes an enlarged shoulder 21 having a forwardly projecting cylindrical section arranged concentrically therewith. The exterior surface of forwardly projecting cylindrical section 22 is threaded at 23 so as to threadably engage the threads 15 of the support 10.

The hub assembly 20 includes a conventional shaft-receiving aperture or bore 24 extending through the central portion thereof. Bore 24 includes a keyway 25 as is also conventional. The hub assembly 20 is received by a conventional shaft 27 having a keyway 28. The hub assembly may be secured to the shaft 27 by any conventional means such as a lock nut 29.

The hub assembly 20, as noted previously, is fabricated preferably from nylon or some similar material. Metal might be utilized, alternatively, although the same would have a tendency to cut into the resilient portion of the finger support 10 into which the hub is threaded.

Figure 5:
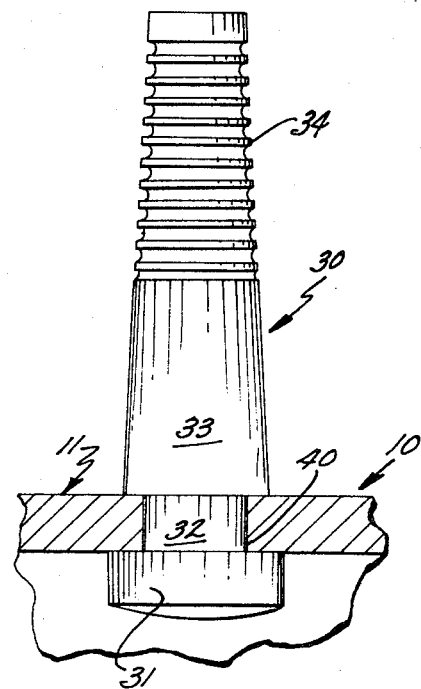
FIG. 5 is a fragmentary view, partially in cross section, of a portion of the finger support having a poultry picking finger mounted thereon.

Referring additionally to FIG. 5, there is illustrated a flexible picking finger 30 which has been mounted through an aperture 40 suitably formed in the bullet-shaped section 11 of finger support 10. The aperture 40, preferably, would be molded into the support 10 during the molding process although the same could be drilled or otherwise formed subsequent to the molding of a totally closed support such as is illustrated in FIG. 1. The finger includes a head 31, a reduced diameter shoulder portion 32 and an elongated picking portion 33 containing conventional feather engaging ridges 34. The aperture 40 should be formed approximately the same size (diameter and thickness) as the shoulder 32 of the finger. The finger can then be affixed to the support in the conventional fashion now utilized with metallic picking supports.

A number of picking fingers will be affixed to each of the supports 10 ordinarily. These fingers may be positioned in accordance with any predetermined pattern, it having been found by the Inventor that good results can be obtained utilizing a pattern such as shown in his previously noted patent. The fingers, additionally, can be of varying lengths, configurations and the like depending upon the type of machine, the type of support and the particular type of poultry being processed. The broader aspects of the instant invention contemplate, of course, the integral molding of the finger-support structure. This particular mode of fabrication may well be acceptable depending upon the support and finger configuration, the particular type of machine and the picking environment in which it is utilized. It may be possible in other situations, similarly, to achieve certain of the objects of this invention merely by making that portion of the support to which the finger attaches from flexible material. The remainder of the support in this situation would likely remain metallic in nature.

OPERATION

The Nylon hub 20 will be affixed to the picking machine during its fabrication. At some point thereafter, the finger supports 10 are attached to the hub by threading the same thereonto, the various lands 23 of the hub threadingly engaging the corresponding helical recesses within portion 14 of the support. The support will be tightened until the lead portion of thread 23 "bottoms" and a suitable span wrench utilized to tighten the support firmly to the hub. In this tightened position, preferably, the rearwardly extending cylindrical portion 18 of sleeve 16 envelopes and overlies the enlarged shoulder 21 of the hub. Such envelopment, as will be readily appreciated by those skilled in the art, will discourage the collecting of feathers and the like in areas which are difficult to gain access to for cleaning purposes. The best results are obtained when the diameter of shoulder portion 21 approximates the interior diameter of section 18 of sleeve 16 so that a reasonable seal is obtained between the two components.

The hub and support should be threaded in a direction such that the support tends to tighten down on the hub during operation of the apparatus. It will be necessary, therefore, to provide both left and right-hand threaded hub-support assemblies for conventional poultry picking machines where the supports are located on either side of a path along which the poultry are conveyed through the picking apparatus.

When the support has been affixed to the apparatus and is in operation, the threaded interengagement of the support and hub will remain firm, primarily because of the resilient nature of the support. The sleeve 16, of course, will function to prevent the section 14 of the support from stretching radially outwardly under either the influence of centrifugal force and/or fatigue of the resilient material.

The fingers 30, upon contacting a bird, will flex. The stress, however, will not be concentrated primarily within the reduced-diameter shoulder portion 32 as has been the situation in previous support-finger arrangements. The stress, rather, will be spread over the support surface to some degree since the same will tend to flex around the various apertures 40 into which the fingers are inserted. This tendency of the instant invention to avoid localized stress points within the finger at the shoulder section will result, of course, in increased finger life and markedly reduce the incidence of finger separation at the shoulder 32.

The wall thickness of the support 10 at those locations where the finger apertures 40 are provided is preferably approximately three-eighth inch. This thickness, and the comparable length of the shoulder section 32, also combine to prevent localized overstressing of the finger at the shoulder portion 32, it having been customary in the past to utilize a much thinner support with a consequent reduction in the size of shoulder portion 32.

When the picking machine embodying the support which is the subject of this invention is in operation, the barking and bruising of poultry being defeathered will be minimized since, even if the poultry do come into contact with the supports, its flexible nature will virtually eliminate damage, the flexible supports being adapted to deform to accommodate the flow of the fowl through the machine. This factor coupled with the factors noted previously will combine, thus, not only to provide longer finger life but, additionally, a better product with a smaller rejection rate.

The supports 10, as noted, will remain tightly affixed to the hubs 22 because of the resilient nature of the threaded engagement between the two components. The supports may be removed, however, with relative ease merely by applying a span wrench and rotating them in the proper direction for removal. It will be possible, thus, to remove the supports quickly and install either reconditioned supports or the same supports after the fingers have been replaced therein with relative ease.

One of the features of the instant invention resides in the tendency of the flexible support to dampen vibrations which have heretofore been transferred along the drive train, etc., by the various metallic couplings and components. The instant invention markedly reduces these vibration transmissions by absorbing the same at the hub-support-finger couplings, thus reducing the ordinary wear and tear which machines of this type have typically experienced.

While a preferred embodiment of this invention has been described in detail, it will be readily apparent to those skilled in the art that other embodiments may be conceived and fabricated without departing from the spirit and scope of this invention. Such other embodiments are to be deemed as included within the scope of the appended claims unless these claims, by their language, expressly state otherwise.

The embodiments of the invention in which an exclusive property or privilege is claimed are defined as follows:

1. In a poultry picking apparatus having at least one movable finger support, a plurality of flexible picking fingers affixed to said support, and means for moving said support such that the fingers thereon yieldably engage poultry placed in proximity thereto, the improvement comprising at least those portions of said support to which said fingers are affixed being fabricated from flexible material.

2. The apparatus as set forth in claim 1 wherein said moving means comprises a shaft with a hub thereon; wherein said support envelops said hub and wherein that portion of said support enveloping said hub is also fabricated from flexible material.

3. The apparatus as set forth in claim 2 which further comprises a reinforcing sleeve positioned about the periphery of that portion of said support enveloping said hub.

4. The apparatus as set forth in claim 3 wherein said hub is threaded on the exterior surface thereof and wherein said support is matingly threaded on the interior surface thereof, the threaded portion of said support being formed from flexible material.

5. The apparatus as set forth in claim 1 wherein generally all of said support is fabricated from flexible material.

6. The apparatus as set forth in claim 5 wherein said support is fabricated from a polymer having a Hardness Durometer A in the approximate range of 60–85.

7. The apparatus as set forth in claim 5 wherein said support is generally bullet-shaped in configuration, the interior thereof being hollow.

8. The apparatus as set forth in claim 7 wherein said support includes a plurality of apertures opening into the hollow interior thereof for receiving and retaining said fingers.

9. The apparatus as set forth in claim 1 wherein said support includes a section thereon having a plurality of finger receiving apertures, said section being fabricated from flexible material in its entirety.

10. A picking finger support for utilization on a poultry picking machine having at least one threaded hub adapted to threadably receive the support, said support comprising a hub engaging section having a threaded interior adapted to threadably mate with said hub, and a finger supporting section affixed to said hub engaging section, said sections being fabricated from flexible material.

11. The support as set forth in claim 10 which further comprises a reinforcing sleeve positioned around and affixed to said hub-engaging section.

12. The apparatus as set forth in claim 10 wherein said finger supporting section is generally bullet-shaped having a cylindrical body section and a convex nose section, said finger supporting section being hollow on the interior.

13. The apparatus as set forth in claim 12 wherein said finger supporting section has a wall thickness of approximately three-eighth inch.

14. The apparatus as set forth in claim 11 wherein said hub has an enlarged shoulder portion thereon rearwardly of the threaded portion thereof and wherein said sleeve extends rearwardly from said hub engaging section to envelop said shoulder portion when said support is threadably mated with said hub, the exterior configuration of said shoulder portion being approximately identical to the interior configuration of said sleeve.

15. The apparatus as set forth in claim 10 wherein said hub engaging section and finger supporting section are integrally molded from flexible material.

16. The apparatus as set forth in claim 15 wherein said flexible material is a polymer having a Hardness Durometer A in the general range of 60–85.

17. The apparatus as set forth in claim 10 wherein said flexible material is a polymer.

* * * * *